United States Patent
De Clercq et al.

(10) Patent No.: US 6,510,204 B2
(45) Date of Patent: Jan. 21, 2003

(54) METHOD AND APPARATUS FOR PROVIDING AN ALL DIGITAL LOOP WITH POWER-OPTIMISED MODE

(75) Inventors: Luc Josephine Theoduul De Clercq, Waasmunster (BE); Franciscus Maria Ploumen, Antwerpen (BE); Marc Maria Marcel Van Bladel, Ghent (BE); Peter Paul Frans Reusens, Laarne (BE); Luc Maria Marcel Verpooten, Schilde (BE); Willem Jules Antoine Verbiest, St. Gillis Waas (BE)

(73) Assignee: Alcatel, Paris (FR)

( * ) Notice: Subject to any disclaimer, the term of this patent is extended or adjusted under 35 U.S.C. 154(b) by 8 days.

(21) Appl. No.: 09/910,038

(22) Filed: Jul. 23, 2001

(65) Prior Publication Data

US 2002/0009133 A1 Jan. 24, 2002

(30) Foreign Application Priority Data

Jul. 24, 2000 (EP) .............................................. 00402120

(51) Int. Cl.⁷ .............................. H04M 1/24; H04M 3/08
(52) U.S. Cl. ..................... 379/28; 379/1.03; 379/9.05; 379/22.04; 379/27.01; 379/27.06; 379/29.01
(58) Field of Search ................................ 379/1.01, 1.03, 379/9.05, 27.01, 27.06, 28, 29.01, 93.01, 322, 323, 324, 413, 1.04, 9, 9.06, 15.01, 16, 17, 22, 22.04, 24, 93.06; 370/216

(56) References Cited

U.S. PATENT DOCUMENTS

| | | | | |
|---|---|---|---|---|
| 4,575,548 A | * | 3/1986 | Smith et al. ................. | 379/279 |
| 5,142,571 A | * | 8/1992 | Suzuki et al. ................. | 379/279 |
| 5,220,597 A | * | 6/1993 | Horiuchi ....................... | 379/362 |
| 5,581,612 A | * | 12/1996 | Nishikawa .................... | 379/1.01 |
| 5,848,053 A | * | 12/1998 | Ardon .......................... | 370/218 |
| 5,883,941 A | * | 3/1999 | Akers .......................... | 379/93.08 |
| 5,943,404 A | * | 8/1999 | Sansom et al. .............. | 379/93.06 |
| 6,233,235 B1 | * | 5/2001 | Burke et al. .................. | 370/356 |
| 6,272,209 B1 | * | 8/2001 | Bridger et al. ............... | 379/27.01 |
| 6,282,204 B1 | * | 8/2001 | Balatoni et al. .............. | 370/421 |
| 6,301,340 B1 | * | 10/2001 | Sansom et al. .............. | 379/93.06 |
| 6,347,075 B1 | * | 2/2002 | Barzegar et al. ............. | 370/228 |
| 6,393,105 B1 | * | 5/2002 | Beveridge .................... | 379/56.2 |
| 6,400,803 B1 | * | 6/2002 | Tate et al. ................... | 379/27.06 |
| 6,449,247 B1 | * | 9/2002 | Manzardo et al. ........... | 370/216 |

FOREIGN PATENT DOCUMENTS

| | | | | | |
|---|---|---|---|---|---|
| GB | | 2313979 A | * | 10/1997 | .......... H04M/11/06 |
| WO | WO 01/89262 A2 | * | 11/2001 | ........... H04Q/11/04 |

* cited by examiner

Primary Examiner—Curtis Kuntz
Assistant Examiner—Quoc D. Tran
(74) Attorney, Agent, or Firm—Sughrue Mion, PLLC

(57) ABSTRACT

An apparatus for use in an all digital loop contains a first network node (30), a second network node (31), and a data transmission line (32) there between. Each one of the first and second network nodes (30, 31) is operable to transmit to the other at least one digitised telephone signal with other digital data via a set of carriers. One of the first and second network nodes (30, 31) thereto includes or is associated with means which in the event of power failure at the first network node (30), is operable selectively to provide power to the first node (30) such that the first node (30) operates only via a limited subset of said carriers. This limited subset is such as to minimise the power required for the transmission of a telephone lifeline signal between the first and second nodes (30, 31).

24 Claims, 2 Drawing Sheets

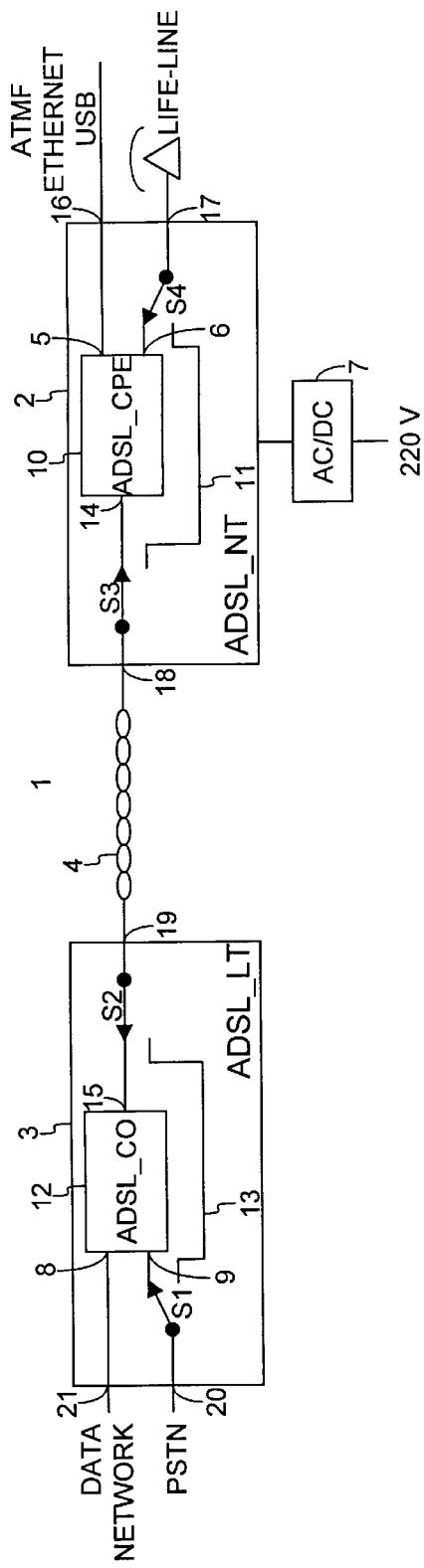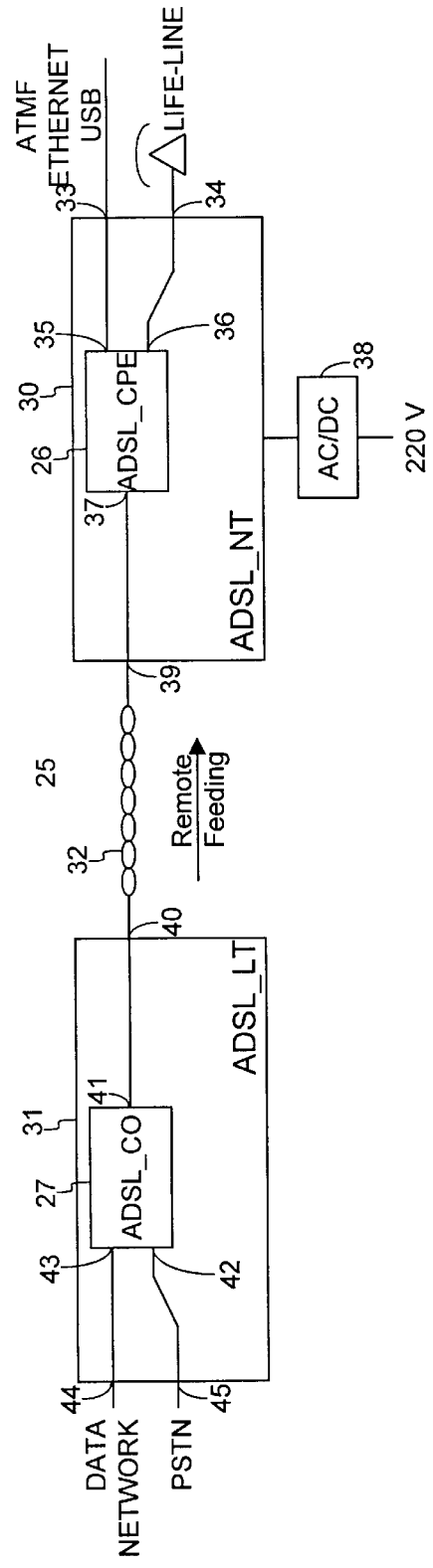
Fig. 1 (Prior Art)
Fig. 2

METHOD AND APPARATUS FOR PROVIDING AN ALL DIGITAL LOOP WITH POWER-OPTIMISED MODE

BACKGROUND OF THE INVENTION

The present invention relates to a method and apparatus for transferring digital voice signals together with high speed data, and particularly to an all digital loop possessing a mode of low-power transfer of such signals. Additionally, the present invention relates to a telephone network comprising such apparatus.

With the proliferation of digital data transmission across telecommunications networks and inter-networks, it has become common practice to integrate the transmission of analogue telephone signals, associated with a 'Plain Old Telephone Service' (POTS), with the transmission of other digital data, upon such networks (e.g. xDSL transmission). In many cases, the latter type of data may well be transmitted via the same transmission medium as the former signals (i.e. via a telephone line).

It is well known that analogue signals associated with POTS and, for example, the digital signal associated with an xDSL (Digital Subscriber Line) data stream, may be simultaneously transmitted via a twisted-pair transmission line.

Such simultaneous data transmission is clearly desirable and its realisation may typically involve the technique of frequency-division multiplexing of the two signals. According to such a technique, a low-frequency transmission band (i.e. 300 Hz–3400 Hz) is assigned to the transmission of analogue telephony signals and a high-frequency transmission band (i.e. band of high-frequency carriers modulated with signal data) is assigned to transmission of the xDSL data stream. Consequently, simultaneous transmission of digital xDSL data and independent analogue telephone signals may be provided via the same twisted-pair transmission line of a telecommunications network.

Such a transmission technique is known, generally, as 'out of band' transmission since telephone signals are transmitted outside of the xDSL transmission band.

A recognised deficiency of this technique lies in the necessity of employing suitable multiplexing/de-multiplexing equipment capable of accepting the relatively high voltage levels typically present in analogue telephone signals (e.g. the ringing signal). Consequently, this equipment (POTS splitter) is often prohibitively expensive (operator dependent) and/or bulky. Born of this realisation came the incentive to develop systems for the simultaneous transmission of digitized telephone signals, together with other independent xDSL digital data, over a twisted pair telephone line.

Such a system, known as an 'all digital loop', thereby obviates the need to employ such expensive/bulky equipment by transmitting telephone signals, together with other digital data, in a digital format only and thereby removing the high-voltage components associated with the analogue telephone signal. For example, digitized telephone signals may be embedded within the frames associated with an xDSL data stream. In such a case, 'in-bond' transmission is achieved since the digitized telephone signals are thereby transmitted within the same transmission band (of carriers) as the xDSL data stream.

In the case of ADSL or VDSL (Very High Speed Digital Subscriber Line) this implies that, in contrast to the traditional 'overlay scenario' where POTS or ISDN are transported 'out of band', the telephony signals are transmitted 'in-band'. That is to say, analogue telephone signals originating from a telephone set are transmitted therefrom to an xDSL network termination node containing xDSL equipment operable to digitise and subsequently transmit those signals to an xDSL line termination in the access node providing the gateway to the PSTN (Publicly Switched Telephone Network) network. This is one way to realise the all digital loop. Alternatively, the telephone signals may be digitized before being supplied to an xDSL network termination to be transmitted subsequently over the all digital loop.

However, a potential weakness of an approach such as this lies in the need to digitise the telephone signals and embed them, via the xDSL equipment, into the xDSL data stream prior to simultaneous transmission thereof. Should xDSL equipment fail due, for example, to a loss of power then both xDSL and (more importantly) telephone communications along the all digital loop would break down.

Clearly, such a loss in telephone communications would be inconvenient at the very least and, conceivably, precipitate disastrous consequences should POTS telephone services be urgently required. Thus, the provision of an emergency 'lifeline' within such all digital loops, which would guarantee continued telephone communications services (POTS) is therefore paramount.

A common prior art technique of providing continued POTS under such circumstances involves the step of reverting to independent analogue transmission of telephone signals. Analogue telephone signals (or digital telephone signals via for instance an ISDN interface) are received at a telephone network termination (NT) node (from a telephone set) for subsequent digital transmission therefrom to a line termination (LT) access node providing a gateway to the PSTN network. Under normal operating conditions 'in-band' transmission of those telephone signals with digital data streams simultaneously input to the xDSL equipment (at the NT node), would then take place in accordance with all digital loop transmission techniques as outlined above.

As discussed above, in the event of power failure at the NT node of the digital loop, 'in-band' digital transmission of neither the telephone signal nor the xDSL data could take place and POTS would be lost. However, when failure occurs, a series of switches may be switched at each node of the digital loop (i.e. the NT and LT nodes) so as to provide a bypass circuit which permits the analogue/digital telephone signal (input to the NT node) to bypass all xDSL equipment in the respective node. Consequently, a direct POTS lifeline from the NT node to the LT node, and thence to the PSTN, is thereby provided.

Unfortunately, as will be readily apparent, such a system requires the use of additional circuitry to bypass the xDSL equipment at both nodes. Furthermore, old existing linecards are required at the LT (access) node to operate the additional circuitry. These linecards must be kept in place at all times so as to guarantee a POTS lifeline and, therefore, cannot be replaced with other equipment should the need, or desire, arise.

SUMMARY OF THE INVENTION

The present invention aims to overcome at least some of the above identified deficiencies of the prior art by providing an all digital loop in which a POTS lifeline is provided without recourse to switching/bypass circuitry and the corresponding linecards associated therewith.

Accordingly, in a first of its aspects the present invention provides apparatus for use in a digital telecommunications network, the apparatus including:

a first network node;

a second network node; and a data transmission line connecting the first network node to the second network node;

wherein each one of said first and second network nodes is operable to transmit to the other of said first and second network nodes, at least one digitized telephone signal with other digital data via a set of carriers, the apparatus being characterised in that:

one of said first and second said network nodes includes or is associated with means which in the event of power failure at the first said network node, is operable selectively to provide power to the first node such that the first node operates only via a limited subset of said carriers which limited subset is such as to minimize the power required for the transmission thereof so as to provide transmission of a telephone lifeline signal between the first and second nodes.

Thus, it will be understood that the present invention, in its first aspect, aims to guarantee a POTS lifeline by means of providing an emergency power supply operable to selectively power the continued digital transmission of telephone signals between two nodes of e.g. an all digital loop using minimal power. Preferably, the limited subset of carriers provides transmission of only one telephone voice channel in the telephone lifeline.

Ideally, the means operable to selectively provide power to the first node includes a power source located substantially at the second node and power is selectively provided to the first node remotely from the second node. However, a power source located substantially locally with first node could be used to selectively provide to the first node locally. For example, the local power supply could include a UPS (Uninteruptable Power Supply) system, a battery of a super-capacitor or the like.

Preferably, said at least one digitized telephone signal is in-band transmitted with said other digital data using e.g. digital subscriber line (xDSL) transmission techniques. Preferably, the other digital data with which the digital telephone signal data is transmitted comprises a digital subscriber line data stream (xDSL), and former is transmitted in-band with the latter by embedding the former into the data frames of the latter. ADSL may be used.

Consequently, it will be seen that the first node may be located at an xDSL subscriber premises and the second node may be located at an xDSL central office.

According to a second aspect of the present invention, there is provided a central office of a telecommunications network, having an all digital loop including:

a first network node;

a second network node located at the central office; and a data transmission line connecting the first network node to the second network node;

wherein each one of said first and second network nodes is operable to transmit to the other of said first and second network nodes, at least one digitized telephone signal with other digital data via a set of carriers, the all digital loop being characterised in that:

one of said first and second said network nodes includes or is associated with means which in the event of power failure at the first said network node, is operable selectively to provide power to the first node such that the first node operates only via a limited subset of said carriers which limited subset is such as to minimize the power required for the transmission thereof so as to provide transmission of a telephone lifeline signal between the first and second nodes.

According to a third aspect of the present invention, there is provided a customer premises for use with an all digital loop of a telecommunications network, the all digital loop including:

a first network node located at the customer premises;

a second network node; and a data transmission line connecting the first network node to the second network node;

wherein each one of said first and second network nodes is operable to transmit to the other of said first and second network nodes, at least one digitized telephone signal with other digital data via a set of carriers, the all digital loop being characterised in that:

one of said first and second said network nodes includes or is associated with means which in the event of power failure at the first said network node, is operable selectively to provide power to the first node such that the first node operates only via a limited subset of said carriers which limited subset is such as to minimize the power required for the transmission thereof so as to provide transmission of a telephone lifeline signal between the first and second nodes.

According to a fourth of its aspects, the present invention provides a method of transmitting digital data via a digital telecommunications network, the method including the steps of:

providing a first network node;

providing a second network node;

providing a data transmission line and connecting the first network node to the second network node therewith; and transmitting from any one of said first and second network node to the other of said first and second network nodes, at least one digitized telephone signal with other digital data via a set of carriers; the method being characterised in that in the event of power failure at the first said network node, the method includes the further steps of:

selectively providing power to the first node such that the first node operates only via a limited subset of said carriers which limited subset is such as to minimise the power required for the transmission thereof so as to provide transmission of a telephone lifeline signal between the first and second nodes.

Thus, it will be understood that the present invention, in its fourth aspect, aims to guarantee a POTS lifeline by means of providing an emergency power supply operable to selectively power the continued digital transmission of telephone signals between two nodes of e.g. an all digital loop using minimal power. Preferably, the limited subset of carriers provides transmission of only one telephone voice channel in the telephone lifeline.

Power may be provided locally to the first node (e.g. via a power supply located at the customer (subscriber) premises) using e.g. a UPS, a battery of a super-capacitor or the like, or may be remotely fed from the second node.

Preferably, the at least one digitized telephone signal is in-band transmitted with said other digital data using e.g. digital subscriber line (xDSL) transmission techniques, such as ADSL.

Consequently, the first node may be located at an xDSL subscriber premises and the second node may be located at an xDSL central office.

BRIEF DESCRIPTION OF THE DRAWINGS

The present invention shall now be described by way of non-limiting examples, with reference to the following figures:

FIG. 1 illustrates, in schematic form, an all digital loop with POTS lifeline provision according to the prior art;

FIG. 2 illustrates, in schematic form, an all digital loop with POTS lifeline provision according to an embodiment of the present invention;

DETAILED DESCRIPTION OF THE INVENTION

Figure 3A:
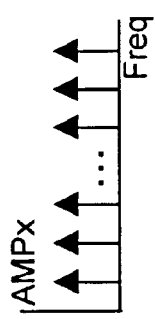
FIG. 3*a* illustrates a simple example of the distribution of data carriers employed under normal operating conditions of the all digital loop according to the present invention.

Referring to FIG. 1 there is illustrated a schematic representation of an all digital loop with POTS lifeline provision according to the prior art.

The loop, generally enumerated 1, consists of an ADSL network termination node 2 (ADSL_NT), an ADSL line termination node 3 (ADSL_LT) and a twisted-pair transmission line 4 via which a data interface 18 (i.e. input/output) of the former node is coupled to a data interface 19 of the latter node. The network termination node 2 is typically located within the premises of a line subscriber (i.e. a customer) and is substantially under the control of that subscriber. It is powered by power supply 7, typically a domestic power supply associated with the subscriber premises.

Conversely, the line termination node 3 is located within a network central office substantially under the control of an operator therein.

Line termination node 3 possesses data interfaces 19, 20 and 21 connectable, respectively, to the corresponding data interfaces 15, 9 and 8 of ADSL central office equipment 12 (ADSL_CO). Node 3 further includes switches S1 and S2, the former being operable to provide a connection between data interfaces 9 and 20 in its first switching state, and between interface 20 and one end of data transmission line 13 in its second switching state. Switch S2 is operable to provide a connection between data interfaces 15 and 19 in its first switching state, and between interface 1 9 and the other end of data transmission line 13 in its second switching state.

Network termination node 2 possesses data interfaces 16, 17 and 18 connectable, respectively, to the corresponding data interfaces 5, 6 and 14 of ADSL customer (i.e. subscriber) premises equipment 10 (ADSL_CPE). Node 2 further includes switches S3 and S4, switch S4 being operable to provide a connection between data interfaces 6 and 17 in its first switching state, and between interface 17 and one end of data transmission line 11 in its second switching state. Switch S3 is operable to provide a connection between data interfaces 14 and 18 in its first switching state, and between interface 14 and the other end of data transmission line 11 in its second switching state.

The ADSL equipment 10 is capable of receiving both digital and analogue signals via data interfaces 5 and 6 respectively, and of digitising received analogue signals, multiplexing the digitized signals with other digital data and subsequently transmitting that combined data as an ADSL digital data stream via data interface 14 along the twisted-pair transmission line 4 (provided switches S3 and S4 are in the first switching state). Similarly, digital data may be received from line 4 at data interface 14 for subsequent demultiplexing/digital-analogue conversion thereby, and transmitted, via the ADSL equipment 10, in digital format to data interface 5 and/or in analogue format to data interface 6 (or digital format if data interface 6 for instance is an ISDN interface). This ADSL equipment typically includes a digital data modem such as an ADSL modem.

Furthermore, the ADSL central office equipment 12 is capable of receiving, via data interface 15, an ADSL data stream transmitted along the twisted-pair transmission line 4 from node 2 (with switches S2 and 51 in the first switching state). Equipment 12 is further capable of subsequently de-multiplexing that data stream into its constituent data signals and of outputting those signals, in digital and analogue format respectively, via respective ones of interfaces 8 and 9. Similarly, data may be received from line interfaces 20 and 21 (analogue or digital for line interface 20, and digital for line interface 21 respectively) for subsequent multiplexing and transmission, via the ADSL equipment 12, to data interface 15. This equipment (12) typically includes a digital data modem.

Under normal operating conditions each of switches S1, S2, S3 and S4 reside in the first switching state. Thus, analogue or digital signals input to interface 17 (or 20) of the all digital loop will consequently be output, in analogue or digital format, via interface 20 (or 17) thereof, while digital data input to interface 16 (or 21) will consequently be output, digitally, via interface 21 (or 16) thereof.

Data interface 16 is a digital data interface and may be an ATMF (Asynchronous Transfer Mode Forum) interface or Ethernet interface for connection to a LAN (Local Area Network), or a USB interface for connection to a personal computer. Data interface 21 is a digital data interface for connection to a digital data network such as the Internet. Conversely, interface 17 is an analogue data interface for connection to the telephone set of the subscriber or a digital data interface for connection to an ISDN terminal for instance, while interface 20 is similarly analogue or digital and connectable to a PSTN.

Thus, the all digital loop 1, of FIG. 1, constitutes a data network whereby POTS telephone signals are embedded into the ADSL data frames of the loop. The ADSL data streams from a subscriber premises may be transmitted to a line termination node providing an access node to both a PSTN and a digital data network such as the Internet.

In the event of the failure of power supply 7 to ADSL equipment 10, nodes 2 and 3 are operable to switch each of switches S1, S2, S3 and S4 to the second state thereby providing a POTS 'lifeline' transmission path (via line 11) circumventing the redundant equipment 10 and via which path telephone signals may continue to be transmitted (in analogue format or digital format) to node 3. Similarly, equipment 12 completes the POTS 'lifeline' transmission path (via line 13) which circumvents redundant equipment 12 and transfers telephony signals to interface 20 an thence to a PSTN.

After the emergency situation, the all digital loop can return to the initial state. The central office thereto may contain a loop current detector, not shown in the figures, that detects if an ADSL modem or POTS phone is connected at the customer premises side, and that can switch the relays in the central office to their initial states.

It is to be noted that, although equipment 12 may still (and usually will) possess a fully functioning power supply in spite of the failure of supply 7, it will nevertheless be redundant for the purposes of processing the analogue or digital telephony signals transmitted via the POTS lifeline since it is operable to process digital ADSL data streams, input to interface 15, and not analogue or digital telephony signals.

A variant of the just described prior art all digital loop has a digital interface 9-20 (e.g. an E1 interface) between the central office and the PSTN. This digital E1 interface in case of emergency would be replaced by an analogue slic (subscriber line interface circuit) in the PSTN.

Referring to FIG. 2 there is illustrated a schematic representation of an all digital loop with POTS lifeline provision according to the present invention.

The all digital loop of the present invention, generally enumerated 25, consists of an ADSL network termination node 30 (ADSL_NT), an ADSL line termination node 31 (ADSL_LT) and a twisted-pair transmission line 32 via which a data interface 39 (e.g. input/output) of the former node is coupled to a data interface 40 of the latter node. The network termination node 30 is typically located within the premises of a line subscriber and is substantially under the control of that subscriber. It is powered by power supply 38, typically a domestic power supply associated with the subscriber premises. Conversely, the line termination node 31 is located within a network central office substantially under the control of an operator therein.

Consequently, it will be seen that, at least in general terms, the architecture of the all digital loop according to the present invention is substantially the same as that of prior art loop 1 (FIG. 1). However, as shall be discussed henceforth, the structure and operation of each node (30, 31) of the present loop is fundamentally different to that of the aforementioned prior art.

In particular, line termination node 31 possesses data interfaces 40, 44 and 45 connected, respectively, to the corresponding data interfaces 41, 43 and 42 of ADSL central office equipment 27 (ADSL_CO). It will be noted that node 31 possesses none of the switches (i.e. S1 and S2) associated with the prior art and, consequently, the connection between data interfaces 42 and 45, and data interfaces 40 and 41, is substantially constant. Furthermore, transmission line 13 of the prior art is absent presently.

Network termination node 30 possesses data interfaces 33, 34 and 39 connectable, respectively, to the corresponding data interfaces 35, 36 and 37 of ADSL customer (i.e. subscriber) premises equipment 26 (ADSL_CPE). Similarly, it will be readily apparent that node 30 possesses none of the switches (i.e. S3 and S4) associated with the prior art and, consequently, the connection between data interfaces 34 and 36, and data interfaces 37 and 39, is substantially constant. Transmission line 11 of the prior art is also absent from the nodes of the loop, in accordance the present invention.

The ADSL equipment 26 in node 30 is capable of receiving digital data and analogue or digital telephone signals via data interfaces 35 and 36 respectively, and of digitising the analogue signals (in case interfaces 45 and 34 are no digital interfaces) then multiplexing the digital data and digitized signals before subsequently transmitting the multiplexed digital data stream as an ADSL digital data stream via data interface 37 along the twisted-pair transmission line 32.

Consequently, it will be seen that equipment 26 provides transmission of digitized telephone signals 'in-band' with the ADSL data stream. Similarly, such ADSL data may be received from transmission line 32 at data interface 37 for subsequent de-multiplexing of the digitized and digital signals therefrom and (subsequent to digital-analogue conversion) be transmitted, via the ADSL equipment 26, to data interfaces 35 (digital) and/or 36 (analogue or digital). In the present embodiment, this equipment includes a digital data modem such as an ADSL modem for enabling the transmission/reception of ADSL data streams.

Data interface 33 is a digital data interface and may be an ATMF (Asynchronous Transfer Mode Forum) interface or Ethernet interface for connection to a LAN (Local Area Network), or a USB interface for connection to a personal computer. However, interface 34 is an analogue data interface for connection to the telephone set of the subscriber or a digital data interface for connection to a subscribers ISDN terminal for example.

The ADSL central office equipment 27 is capable of receiving, via data interface 41, an ADSL data stream transmitted along the twisted-pair transmission line 32 from node 30. Furthermore, the equipment 27 is also capable of subsequently de-multiplexing that data stream into its constituent digital data and digitized phone-signals and of outputting those signals via respective ones of interfaces 43 and 42 (subsequent to digital-analogue conversion of the digitized phone signals in case interface 45 is an analogue interface). Similarly, data may be received from line interfaces 44 and 45 for subsequent multiplexing and transmission, via the ADSL equipment 27, to data interface 41. The ADSL equipment (27) in this node includes a digital data modem for the purposes of ADSL data stream transmission/reception, in the present embodiment.

Data interface 44 is a digital data interface for connection to a digital data network such as the Internet, while interface 45 is similarly analogue or digital and connectable to a PSTN.

It is to be noted that in addition to providing a (e.g. domestic) power supply to node 30 in the form of supply 38, the present invention also provides a 'lifeline' power supply to that node and, therefor, to the ADSL equipment therein (26). In the present embodiment of the invention, this power is supplied remotely from the central office in which the line termination node 31 resides.

Though not explicitly illustrated in the FIG. 2, such remote power feed is indicated. The details of such a remote feeding of power shall not be discussed herein as such details will be readily apparent to the skilled artisan.

Alternatively, the 'lifeline' power supply could be supplied locally to the node 30 at the subscriber premises. Such provision may be achieved by, for example, providing an emergency power supply such as a UPS (Uninterruptable Power Supply), a local battery power feed, or a super-capacitor power supply etc., such as is known in the art According to the present invention, in the event of the failure of power source 38 at node 30, the existence of this condition is conveyed to the central office (e.g. by signalling from node 30 or by monitoring of that node by the central office) so as to initiate the remote supply of 'lifeline' power to subscriber node 30 therefrom. Alternatively, power could be supplied locally as discussed above.

Thus, under normal operating conditions, analogue telephone signal data input to interface 34 (or 45) of the all digital loop 25 will consequently be transferred 'in-band' across the loop, as part of an ADSL data stream, and output via interface 45 (or 34) as an analogue or digital signal to the PSTN. Similarly, digital data input to interface 33 (or 44) will also be transferred across the loop, as part of the ADSL data stream, and be output via interface 44 (or 33) thereof for subsequent transmission within a data network.

A particularly advantageous feature of the present invention lies in the manner in which the 'lifeline' power is utilised to allow not only a POTS lifeline within the digital loop, but also to provide transmission of the POTS lifeline within the digital data band of the ADSL data stream, as shall now be discussed.

The ADSL nodes 30 and 31, and particularly equipment 26 and 27 according to the present invention are operable such that when power failure occurs at the subscriber node 30, the ADSL equipment nodes thereafter operate in a power-optimised mode. This power-optimised mode is optimised to the extent that only the minimum power—sufficient to provide 'in-band' transmission and eventually the digitisation, of a single voice channel—is employed in providing a continued POTS facility between nodes 30 and 31.

The operating principles of this power-optimised mode are best illustrated by considering a method by which the present invention achieves 'in-band' digital telephone signal transmission within the ADSL data stream.

Consider an analogue telephone signal received by a given item of ADSL equipment (26 or 27). This signal is firstly digitized. The digitized telephone signal so produced is then embedded, together with other digital data, into the data frames of an ADSL data stream to be subsequently output from the ADSL equipment in question. In the present embodiment the ADSL data stream is constructed using the known method of Discrete Multi Tone modulation (DMT) which employs frequency-division multiplexing techniques. The frequency-division multiplexing in DMT is implemented by dividing the bandwidth of ADSL data transmission into a discrete number of separate equidistant frequency sub-channels ('carriers'). Conceptually speaking, this is equivalent to providing a separate "modem" on each sub-channel with its own modulated carrier.

ADSL data streams thus become modulated upon a set of such equidistant carriers.

A schematic diagram of a set of such carriers is illustrated in FIG. 3a. This diagram represents the plurality of separate frequency carriers, to be modulated with digital data and/or digitized telephone signals, which comprise a full ADSL data transmission band. (NB. 'Amp' refers to carrier amplitude, while 'Freq' refers to carrier frequency).

One way to execute the embedding of the digital telephone signal is to modulate that signal on a subset of the carriers of the ADSL band. That is to say, modulating the telephone signals onto a subset of DMT carriers.

This technique is employed according to the present embodiment of this invention, however, it is to be understood that alternative techniques of data transmission could be employed without departing from the scope of the present invention (e.g. Quadrature Amplitude & Phase modulation (QAM), or Carrierless Amplitude & Phase modulation (CAP) could be used)

In normal operating conditions, the ADSL equipment 26 provides such 'in-band' digitized telephone signal transmission across many of the available carriers of the ADSL band thereby, preferably, providing high-capacity data transmission over many voice channels. However, according to the present embodiment, in the event of power failure at supply 38 and subsequent supply of 'lifeline' power to node 30, the ADSL equipment will then only provide digitisation and transmission for one POTS lifeline voice channel and will cease any other data transmission or processing. The ADSL equipment will also limit the number of carriers and the transmit PSD (indeed, in addition to reducing the number of carriers, a reduction of the transmit power spectral density can give a substantial power-optimisation) employed in the ADSL band for the transmission of that one voice channel between nodes 30 and 31.

Figure 3B:
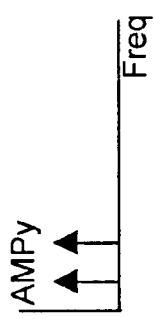
FIG. 3*b* illustrates a simple example of the distribution of data carriers employed in the power-optimised mode of the all digital loop with POTS lifeline provision according to the present invention.

FIG. 3b illustrates a schematic graph of such a limited number of carriers employed in the power-optimised mode of ADSL equipment.

A particular feature of the present invention is the power-optimised allocation of required POTS lifeline capacity. That is to say, the present invention provides that the number and frequency of carriers that are allocated to POTS lifeline transmission and reception by the ADSL equipment (26 and 27), are such as to be sufficient in number and/or frequency to support only the minimum lifeline transmission capacity while being of sufficiently limited number to enable minimal lifeline power supply to the node 30. Due to the typically small lifeline capacity required for supporting only one voice channel in power-optimised mode, the number of carriers employed under such conditions can be limited from the usual number of approximately 200 or more carriers used in normal conditions, to as few as, for example, 16 carriers for the one lifeline voice channel. Of course, the number of power-optimised carriers employed for the one voice channel will vary in dependence upon the requirements of lifeline capacity and power needs. To this extent, all functions of the subscriber node 30 superfluous to POTS lifeline transmission at minimum power levels, are switched off automatically by the power-optimised node. Such superfluous functions are those of e.g. compression, Ethernet interfacing etc.

Consequently, it will be understood that the present invention thereby provides an all digital loop with POTS lifeline provision without by-pass/switching circuitry (e.g. S1, S2, S3, S4 etc.) or the POTS linecards associated (at the central office) with such circuitry.

It is to be noted that though the embodiment of the present invention, as described above, employs an ADSL transmission methods and apparatus, other xDSL methods and apparatus may be similarly applied without departing from the scope of the present invention (e.g. VDSL etc.). Indeed, it is to be understood that variations and modifications such as would be readily apparent to the skilled artisan, may be made to the embodiments described above without departing from the scope of the present invention. As already indicated throughout the text, one such apparent modification would be to perform the digitisation in the PSTN or telephone set, to have no digitisation capability in 26 and 27, but to have digital interfaces 34 and 42.

What is claimed is:

1. Apparatus for use in a telecommunications network, the apparatus including:
   a first network node (30);
   a second network node (31); and
   a data transmission line (32) connecting the first network node (30) to the second network node (31);
      wherein each one of said first and second network nodes (30, 31) is operable to transmit to the other of said first and second network nodes (30, 31), at least one digitized telephone signal with other digital data via a set of carriers, the apparatus being;

CHARACTERISED IN THAT:
one of said first and second said network nodes (30, 31) includes or is associated with means which in the event of power failure at the first said network node (30), is operable selectively to provide power to the first node (30) such that the first node (30) operates only via a limited subset of said carriers which limited subset is to minimize the power required for the transmission thereof so as to provide transmission of at least a telephone lifeline signal between the first and second nodes (30, 31).

2. Apparatus for use in a telecommunications network according to claim 1,
wherein the limited subset of carriers provides transmission of only one telephone voice channel in the telephone lifeline.

3. Apparatus for use in a telecommunications network according to claim 1,
wherein the means operable to selectively provide power to the first node includes a power source located substantially at the second node (31) and power is selectively provided to the first node (30) remotely from the second node (31).

4. Apparatus for use in a telecommunications network according to claim 1,
wherein the means operable to selectively provide power to the first node (30) includes a power source located substantially locally with first node (30) and power is selectively provided to the first node (30) locally.

5. Apparatus for use in a telecommunications network according to claim 4,
wherein the local power source includes a UPS (Uninteruptable Power Supply) system.

6. Apparatus for use in a telecommunications network according to claim 4,
wherein the local power source includes a battery power supply.

7. Apparatus for use in a telecommunications network according to claim 4,
wherein the local power source includes a super-capacitor power supply.

8. Apparatus for use in a telecommunications network according to claim 1,
wherein said at least one digitized telephone signal is in-band transmitted with said other digital data using digital subscriber line (XDSL) transmission techniques.

9. Apparatus for use in a telecommunications network according to claim 8,
wherein ADSL transmission is used.

10. Apparatus for use in a telecommunications network according to claim 1,
wherein the first node (30) is located at an xDSL subscriber premises and the second node (31) is located at an XDSL central office.

11. Apparatus according to any claim 1,
wherein the digital data is transmitted via an all digital loop.

12. A central office of a telecommunications network, having an all digital loop including:
a first network node (30);
a second network node (31) located at the central office; and
a data transmission line (32) connecting the first network node (30) to the second network node (31);
wherein each one of said first and second network nodes (30, 31) is operable to transmit to the other of said first and second network nodes (30, 31), at least one digitized telephone signal with other digital data via a set of carriers, the all digital loop being;
CHARACTERISED IN THAT:
one of said first and second said network nodes (30, 31) includes or is associated with means which in the event of power failure at the first said network node (30), is operable selectively to provide power to the first node (30) such that the first node (30) operates only via a limited subset of said carriers which limited subset is to minimize the power required for the transmission thereof so as to provide transmission of at least a telephone lifeline signal between the first and second nodes (30, 31).

13. A customer premises for use in an all digital loop of a telecommunications network, the all digital loop including:
a first network node (30) located at the customer premises;
a second network node (31); and
a data transmission line (32) connecting the first network node (30) to the second network node (31);
wherein each one of said first and second network nodes (30, 31) is operable to transmit to the other of said first and second network nodes (30, 31), at least one digitized telephone signal with other digital data via a set of carriers, the all digital loop being;
CHARACTERISED IN THAT:
one of said first and second said network nodes (30, 31) includes or is associated with means which in the event of power failure at the first said network node (30), is operable selectively to provide power to the first node (30) such that the first node (30) operates only via a limited subset of said carriers which limited subset is to minimize the power required for the transmission thereof so as to provide transmission of at least a telephone lifeline signal between the first and second nodes (30, 31).

14. A method of transmitting digital data via a telecommunications network, the method including the steps of:
providing a first network node (30);
providing a second network node (31);
providing a data transmission line (32) and connecting the first network node (30) to the second network node (31) therewith; and
transmitting from any one of said first and second network node (30, 31) to the other of said first and second network nodes (30, 31), at least one digitized telephone signal with other digital data via a set of carriers; the method being:
CHARACTERISED IN THAT:
in the event of power failure at the first said network node (30), the method includes the further steps of:
selectively providing power to the first node (30) such that the first node (30) operates only via a limited subset of said carriers which limited subset is such as to minimize the power required for the transmission thereof so as to provide transmission of at least a telephone lifeline signal between the first and second nodes (30, 31).

15. A method of transmitting digital data via a telecommunications network according to claim 14,
wherein the limited subset of carriers provides transmission of only one telephone voice channel in the telephone lifeline.

16. A method of transmitting digital data via a telecommunications network according to claim 14,
wherein power is selectively provided to the first node (30) via a power source located substantially at the second node (31) and power is selectively provided to the first node (30) remotely from the second node (31).

17. A method of transmitting digital data via a telecommunications network according to claim 14,
wherein power is selectively provided to the first node (30) via a power source located substantially locally with the first node (30) and power is selectively provided to the first node (30) locally.

18. A method of transmitting digital data via a telecommunications network according to claim 17,
wherein the local power source includes a UPS (Uninteruptable Power Supply) system.

19. A method of transmitting digital data via a telecommunications network according to claim 17,
wherein the local power source includes a battery power supply.

20. A method of transmitting digital data via a telecommunications network according to claim 17,
wherein the local power source includes a super-capacitor power supply.

21. A method of transmitting digital data via a telecommunications network according to claim 14,
wherein said at least one digitized telephone signal is in-band transmitted with said other digital data using digital subscriber line (xDSL) transmission techniques.

22. A method of transmitting digital data via of a telecommunications network according to claim 21,
wherein ADSL transmission is used.

23. A method of transmitting digital data via a telecommunications network according to claim 14,
wherein the first node (30) is located at an xDSL subscriber premises and the second node (31) is located at an XDSL central office.

24. A method of transmitting digital data via a telecommunications network according to claim 14,
wherein the digital data is transmitted via an all digital loop.

* * * * *